United States Patent
Holenstein et al.

(10) Patent No.: US 11,782,907 B1
(45) Date of Patent: Oct. 10, 2023

(54) METHOD AND APPARATUS FOR COMBINING RESPONSES TO A PLURALITY OF USER REQUESTS IN A SYSTEM THAT VALIDATES TRANSACTIONS

(71) Applicant: Gravic, Inc., Malvern, PA (US)

(72) Inventors: Bruce D Holenstein, Media, PA (US); Paul J. Holenstein, Downingtown, PA (US); Dylan R. Holenstein, Newtown Square, PA (US)

(73) Assignee: GRAVIC, INC., Malvern, PA (US)

(*) Notice: Subject to any disclaimer, the term of this patent is extended or adjusted under 35 U.S.C. 154(b) by 0 days.

(21) Appl. No.: 18/312,497

(22) Filed: May 4, 2023

(51) Int. Cl.
    *G06F 16/23* (2019.01)

(52) U.S. Cl.
    CPC ............................... *G06F 16/2379* (2019.01)

(58) Field of Classification Search
    None
    See application file for complete search history.

(56) References Cited

U.S. PATENT DOCUMENTS

| | | |
|---|---|---|
| 9,734,190 B1 | 8/2017 | Holenstein et al. |
| 9,922,074 B1 | 3/2018 | Hoffmann et al. |
| 10,467,223 B1 | 11/2019 | Holenstein et al. |
| 10,642,826 B1 * | 5/2020 | Holenstein .......... G06F 16/2379 |

OTHER PUBLICATIONS

"New Data Integrity Architectures for Mission Critical Systems." "The Connection" journal, Nov. 2021, Accessed from web page: https://connect2nonstop.com/new-data-integrity-architectures-for-mission-critical-systems/ (accessed Mar. 20, 2023), 16 pages.

* cited by examiner

*Primary Examiner* — Scott A. Waldron
(74) *Attorney, Agent, or Firm* — Clark A. Jablon

(57) ABSTRACT

Methods and apparatus are provided to combine responses to a plurality of user requests in a system that validates transactions. The system includes a plurality of nodes, a transaction response combiner (TRC), and a plurality of queues located in the TRC. Each queue is associated with one of the plurality of nodes. Each node executes an instance of the same application, and each node receives each one of the plurality of user requests. The application produces a response for each one of the plurality of user requests, and each response includes response details. In operation, the TRC receives a response from each of the nodes for each of the user requests. Each response is tagged with an identifier that corresponds with the respective user request. At least some of the tagged responses for one of the plurality of nodes is inserted into a queue. It is then detected when a response received at the TRC from one of the nodes has one or more corresponding responses in one or more of the queues by searching for responses that have the same tag. Rules of a rules engine are applied to combine the responses generated by the applications on the plurality of nodes for each of the user requests into a final response. The rules of the rules engine are applied to the corresponding responses with the same tag and the response details for the response that shares the same detected tag. The final response is then outputted by the TRC.

24 Claims, 8 Drawing Sheets

Flowchart

Figure 1: PRIOR ART: Dual Server Reliability Validation Architecture

Figure 2: PRIOR ART: Triple Server Reliability Validation Architecture

Figure 3: PRIOR ART: Typical node with partitions spread over multiple disks

Figure 4: Validation Architecture Application Framework

Figure 5: TRC handling simultaneous VA node responses

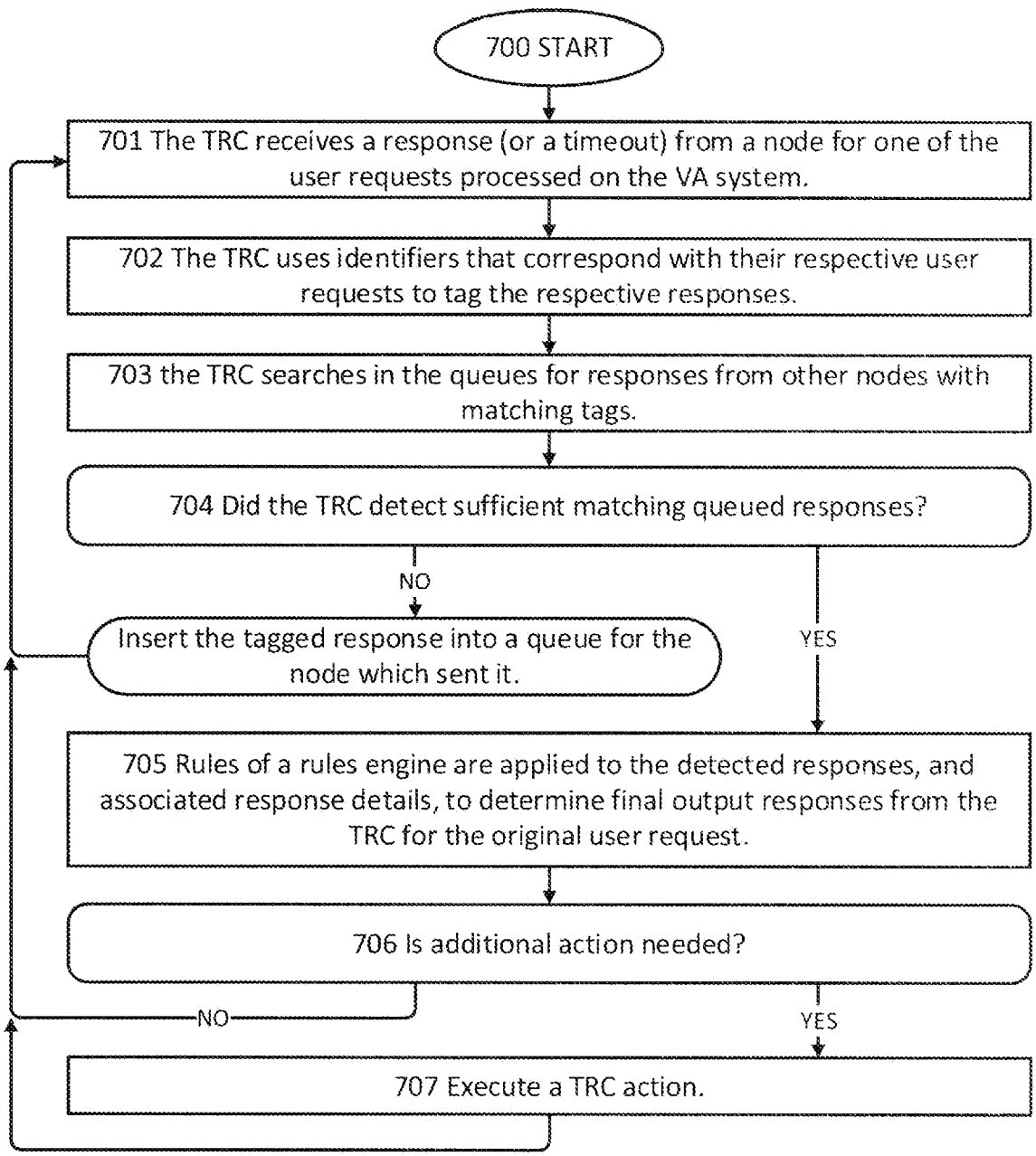
Figure 7: Flowchart

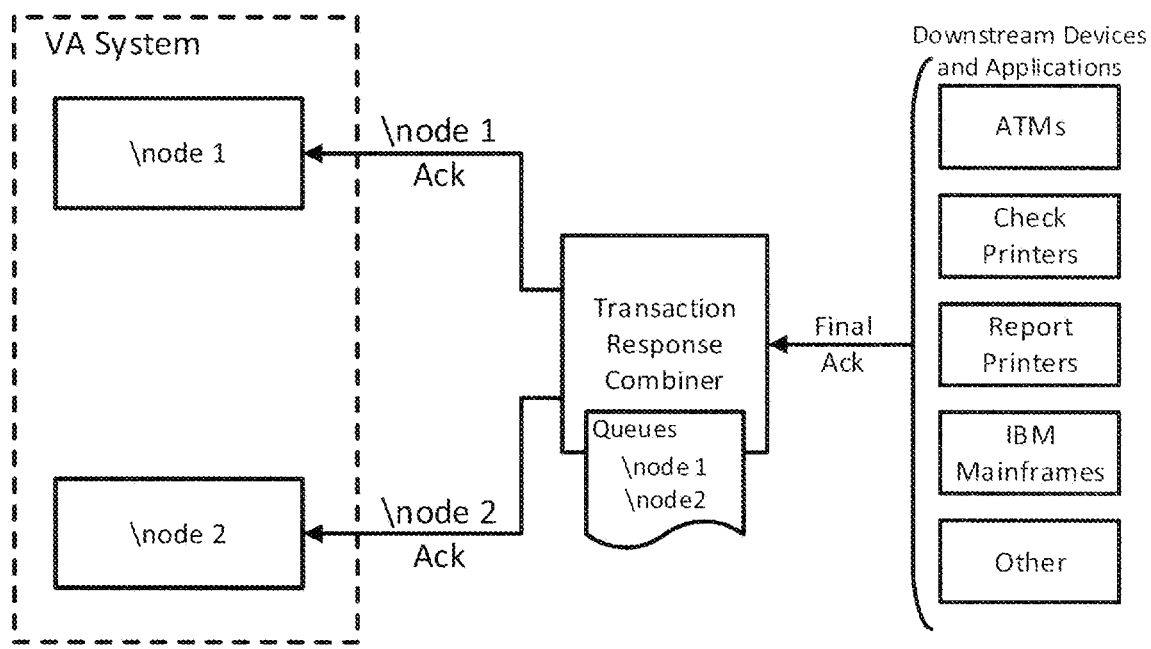
Figure 8: TRC Handling Acknowledgements

METHOD AND APPARATUS FOR COMBINING RESPONSES TO A PLURALITY OF USER REQUESTS IN A SYSTEM THAT VALIDATES TRANSACTIONS

BACKGROUND OF THE INVENTION

Certain terms used in the "Background of the Invention" are defined in the "Definitions" section.

1.1 Database Integrity and Reliability

It is imperative that the databases in a distributed system contain matching data for the duplicated data and otherwise stay in sync with each other. Any differences between them (that are not caused by normal data distribution latency) must be quickly identified and resolved, or else subsequent processing could return erroneous or inconsistent results. Database integrity issues could be introduced for a variety of reasons, for example, due to anomalies in the Audit Trails (also known as "Change Logs") that drive the data distribution engines, user error, malicious activity, hardware failures, "bit rot," and many other sources.

Prior art methods exist for comparing two databases to make sure that they match. For example, the SOLV and Compare products from Gravic, Inc., USA take a copy of some (or all) of the data in one of the databases, and send it to a daemon that reads a similar data set from the other database, comparing each field or column of every record or row in the copy to make sure they match. Using SOLV and/or Compare, extra data, missing data, or data in both databases that has divergent data subsets (e.g., a field or column in a record or row does not match), can be identified and resolved. Comparing two databases is usually accomplished in a periodic fashion, perhaps every evening after the on-line processing is completed.

1.2 Validation Architecture Systems

Validation Architecture (VA) systems ensure high database integrity for changes made in real-time to a distributed system. An example is shown in FIG. 1, and described further in U.S. Pat. No. 9,734,190 (Holenstein et al.), U.S. Pat. No. 9,922,074 (Hoffmann et al.), and U.S. Pat. No. 10,467,223 (Holenstein et al.), which incorporates two or more nodes. With this type of architecture system, each node is processing the same user request/transaction. A Transaction Distributor sends the request to process a transaction to two nodes (L and L' in FIG. 1). Each node calculates indicia of some sort representing the result of its current real-time processing. For instance, indicia could be calculated using a unique hash function on the transactional changes made by the system to its database.

The indicia calculated by the two nodes are exchanged and compared by each node. If they match, the transaction is committed/accepted. If they don't match, the transaction is aborted (or in some embodiments only an alert or error message are issued, or one or more nodes are shutdown, or other remediation action is taken). In this context, "match" may be an identical match, but it can also encompass forms of fuzzy or intelligent inexact matching. One example of fuzzy matching is if the two nodes use different rounding algorithms on a calculation or have different floating-point implementations. The inexact match could then consist of a tolerance such as the match is accepted if the difference is within one thousandth of a percent. Fuzzy matching could also involve utilizing only a subset of the columns affected in the transaction.

The benefit of a Validation Architecture is that it detects all single-system corruption, and many multiple-system types of corruption, such as hardware/software failures or malware in real-time to prevent the propagation of data integrity and reliability issues from cascading and destroying the soundness of the entire database or subsequent down-stream processing.

The November 2021 issue of "The Connection" journal describes Level 0, Level 1 and Level 2 Validation Architectures in an article entitled "New Data Integrity Architectures for Mission Critical Systems." Level 0 Offline Transaction Validation occurs periodically using database compare operations after potentially many transactions have been processed. Level 1 Asynchronous Transaction Validation occurs on-line when the transaction being validated has just committed (completed) before or during the computation and exchange of the indicia of the transaction outcome for comparison. Level 2 Synchronous Transaction Validation involves the Validation Architecture system software joining the transaction as a voting member. Similar to Level 1, the indicia are calculated and exchanged. However, with Level 2 these steps occur before the transaction is committed, so if the indicia exchanged do not match, the transaction can be aborted before the damage is done to the database.

The architecture shown in FIG. 1 is a Dual Server Reliability (DSR) configuration. A Triple Server Reliability (TSR) configuration is shown in FIG. 2. All nodes process the same transaction, and their indicia are compared. If all indicia match, the transaction is committed (Level 2 VA) and all nodes of the VA system will produce the same output response. If only indicia of two nodes match, the transaction is committed on those two nodes; and the third node can be taken out of service or have corrective action taken. An error indication can be posted for manual resolution of the problem, if necessary. Complications can result in processing if, for example, the nodes of the system have databases spread over multiple partitions as illustrated in FIG. 3. The entries made into the change log for the various partitions may be in a non-deterministic order resulting in indicia calculation issues, and potential divergence of the output results from the various nodes of the VA system.

1.3 What is Needed

FIG. 17 and column 26, lines 47-55 of Hoffmann '074 discusses a "response joiner" which accepts the responses from the Validation Architecture system nodes and generates a single output response for the system, but is silent on the method by which such a component operates.

Especially for Level 0 and Level 1 Validation Architecture systems, the output responses of the nodes executing the application may not always agree. This is because the validation process commences after the node responses are generated, as the transactions were already committed on the various nodes. With Level 2 VA systems, the application transactions will be aborted if the indicia do not match, at least on a node which is operating correctly. However, different hardware, operating system software, and application software versions or providers, for example, may be involved in the system build for the various nodes each with potentially different behaviors. Also, a hacker, operator error, software bug, or other problem may affect the proper operation of a node. Therefore, all three Levels of Validation Architecture systems may produce erroneous or diverging responses from the nodes that make up the system. This may happen despite the problem being detected and acted upon by the nodes, or a subset of the nodes, of the VA system. High-speed systems may not allow operators time to act on alerts if recovery actions are less than fully automated.

What is a needed is a system and method that is able to combine the responses from the nodes of a Validation Architecture system into a correct final response that ensures that the benefits of the architecture are realized by the stakeholders in the system.

BRIEF SUMMARY OF THE INVENTION

Methods and apparatus are provided to combine responses to a plurality of user requests in a system that validates transactions. The system includes a plurality of nodes, a transaction response combiner (TRC), and a plurality of queues located in the TRC. Each queue is associated with one of the plurality of nodes. Each node executes an instance of the same application, and each node receives each one of the plurality of user requests. The application produces a response for each one of the plurality of user requests, and each response includes response details. In operation, the IRC receives a response from each of the nodes for each of the user requests. Each response is tagged with an identifier that corresponds with the respective user request. At least some of the tagged responses for one of the plurality of nodes are inserted into a queue. It is then detected when a response received at the TRC from one of the nodes has one or more corresponding responses in one or more of the queues by searching for responses that have the same tag. Rules of a rules engine are applied to combine the responses generated by the applications on the plurality of nodes for each of the user requests into a final response. The rules of the rules engine are applied to the corresponding responses with the same tag and the response details for the response that shares the same detected tag. The final response is then outputted by the TRC.

BRIEF DESCRIPTION OF THE DRAWINGS

The foregoing summary, as well as the following detailed description of preferred embodiments of the invention, will be better understood when read in conjunction with the appended drawings. For the purpose of illustrating the invention, the drawings show presently preferred embodiments. However, the invention is not limited to the precise arrangements and instrumentalities shown. In the drawings:

FIG. 7 shows a flowchart of one preferred embodiment of the present invention.

FIG. 8 shows the TRC handling acknowledgements and/or responses from the downstream devices and applications in accordance with a preferred embodiment of the present invention.

DETAILED DESCRIPTION OF THE INVENTION

Figure 1:
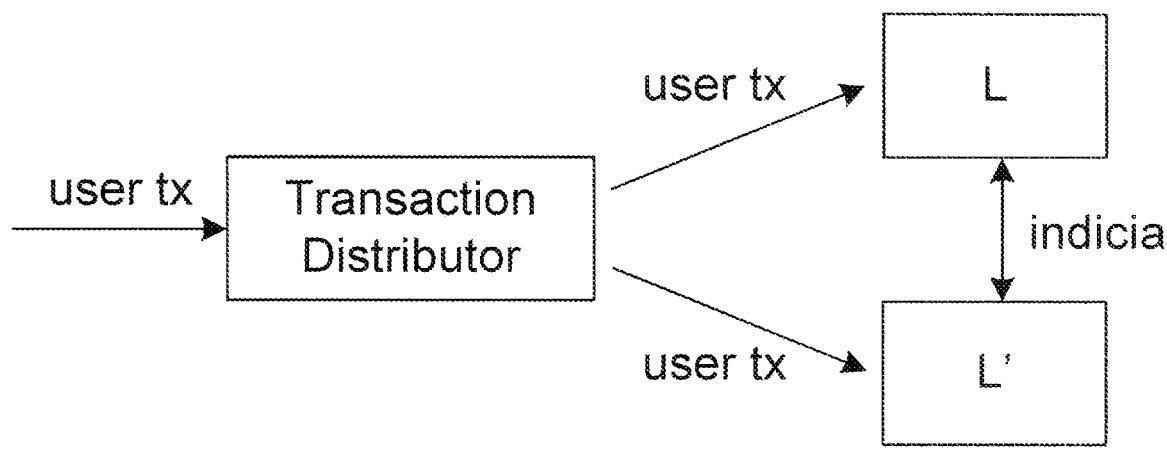
FIG. 1 shows a prior art Dual Server Reliability (DSR) Validation architecture.
Figure 2:
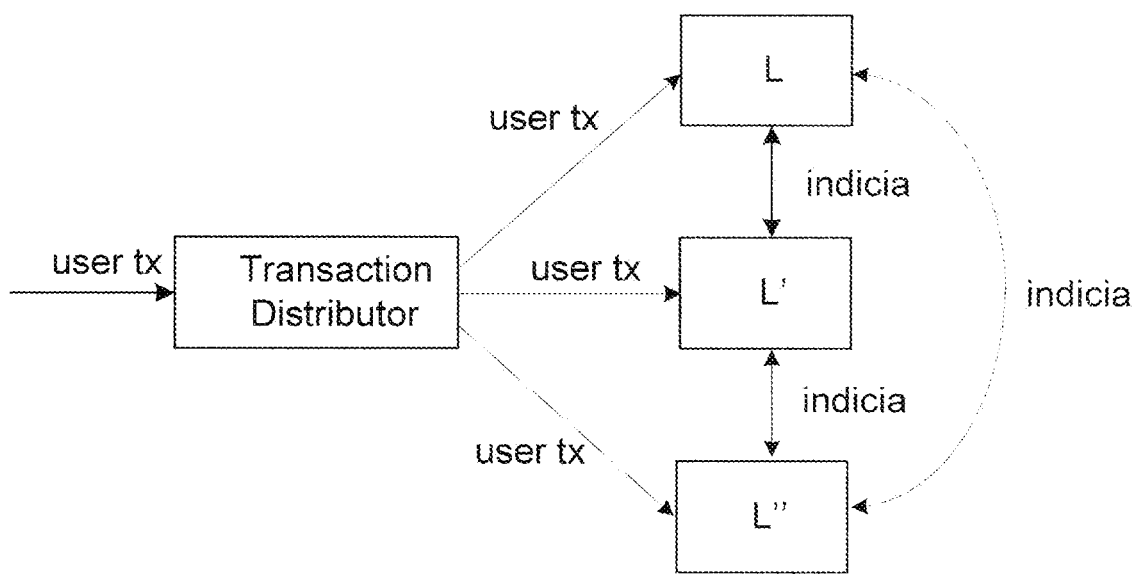
FIG. 2 shows a prior art Triple Server Reliability (TSR) Validation architecture.
Figure 3:
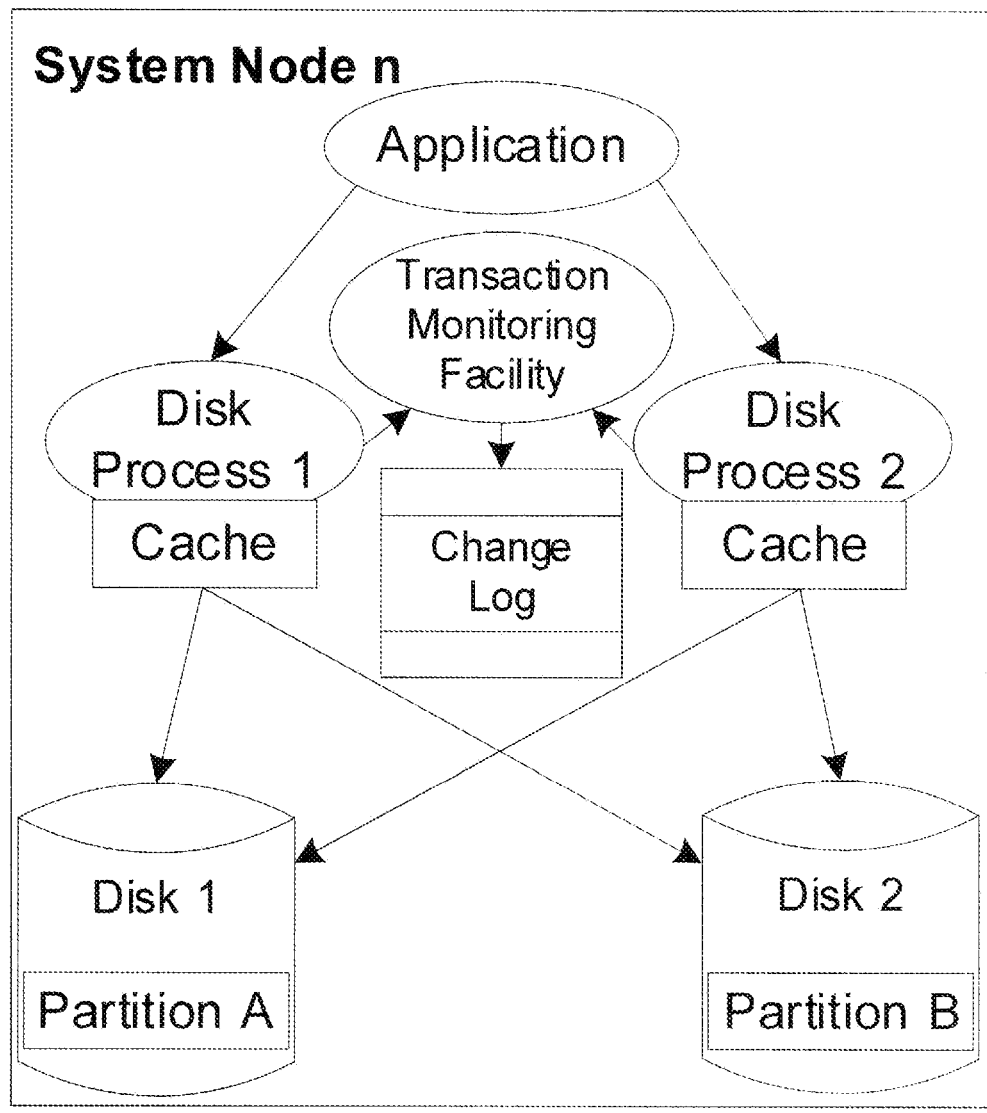
FIG. 3 shows a typical node of a multi-node system with partitions spread over multiple disks.

Certain terminology is used herein for convenience only and is not to be taken as a limitation on the present invention.

The words "a" and "an", as used in the claims and in the corresponding portions of the specification, mean "at least one."

Definitions

The following definitions describe the use of certain terms in this specification and are provided to promote understanding of the present invention. They are hierarchically ordered in that each definition builds on previous definitions.

Table—A set of data values that is organized using a model of horizontal rows and vertical columns. The columns are identified by name, and the rows are uniquely identified by the values appearing in a particular column subset (the table's primary key). A table usually characterizes an entity set. Each row in the table describes an instance of the entity set. Each column describes an attribute of the entity set.

File—The equivalent of a table for nonrelational databases. A file is made up of records, and each record describes an entity instance. A record is made up of fields, each of which describes an attribute of the entity set. In this specification, the term "table" or "file" is to be interpreted as "table and/or file."

Column—A table component that holds a single attribute, such as SALARY, of the entity set.

Field—A file component that holds a single attribute, such as SALARY, of the entity set. In this specification, the term "column" or "field" is to be interpreted as "column and/or field."

Row—A table component that represents an entity instance. It may be represented as a sequence of {column name, value} pairs which can be implemented as a sequence of values positioned according to their corresponding column names. For instance, (EMPLOYEE NUMBER, 235), (NAME, Joe Smith), (DEPARTMENT, Accounting), (SALARY, $30,000).

Record—The same as a row, but "row" is usually used for relational databases; and "record" is usually used for file systems. In this specification, the term "row" or "record" is to be interpreted as "row and/or record."

Database—A collection of related tables or files.

Insert—The addition of a row into a database.

Update—The modification of a row in a database.

Delete—The removal of a row from a database.

Change—An insert, update, or delete.

Function—A logical implementation of a task or service.

Program—An executable set of programming code for providing a specific function or set of functions.

Executable—A program.

System—A set of one or more nodes that work together to deliver application services.

Computer—A device with one or more processors with memory and input/output devices that is configured to execute an application program.

Node—A device, such as a computer, that works together, e.g., over a network, with one or more other nodes to make up a system.

Process—A program running in a computer. A process provides one or more functions. One program can be spawned as multiple distinguishable processes, and/or utilize multiple processes. Processes usually have a name (e.g., $DISK1) or number (e.g., 12,223) that identifies it uniquely on the computer.

Application—One or more processes cooperating to perform one or more useful functions for end users.

Operating System—A software facility that manages computer hardware resources and provides common services for application processes. Services include time functions, reading and writing interprocess messages, and database manipulation.

End Users—People, systems, devices, applications, or any other entity that can influence an application or can request or use the services that it provides.

Redundant System—A system architecture which includes of two or more systems (e.g., nodes) that are operating in a way to increase the overall availability of the application to end users.

Active/Backup and Active/Active Systems are two primary redundant system architectures. Data replication is typically used to keep the databases in the redundant systems synchronized.

Backup—Creating a copy of a database to protect it from loss.

Online Backup—Creating a copy of an active database to protect it from loss.

Restore—Restoring a database into a consistent state by loading a backup copy and typically rolling forward changes that occurred to the backup copy once the backup was started but before it was completed.

Virtual Tape—Emulated magnetic tape images, usually stored on a disk, which may be remote from the source system.

Change Log (also, interchangeably referred to herein as an "audit trail")—A record of changes made to a database. It usually includes a before image (a copy of the original value of the data that was changed) and an after image (a copy of the final value that the data was changed to be). For example, for an insert change, the before value is null and the after value contains the inserted data. For an update change, the before value is the original data value, and the after value is the final data value. For a delete change, the before value is the original data value, and the after value is null. A change log may only include a record of changes made to a database, but may also include information regarding the sequence of actions that occurred, the transaction ID and timestamp for the operations recorded in the change log, and the one or more process IDs that made the changes.

Current Image—The current image is the current value of a data item (e.g., a record or a row) that is in the database.

Related Data—Data that typically must be consistent between all the data items in the data set. For example, a parent row and a child row in a classic referential integrity relationship are related. Creating the child row without the parent row violates the related data relationship. Updates to the same record or row, or to related records or rows, are related as well—replicating the updates out of order can lead to inconsistent data. Non-related data is data that does not have a consistency requirement.

Consistent Database—A database is consistent if its data is valid according to all defined rules, at least for related data. For instance, a parent row must exist for every child row that refers to it.

Record-Oriented Database—A database that is accessed by specifying a key pointing to one or more records. Analogous to a row-oriented database.

Field-Oriented Database—A database that is accessed by specifying a key pointing to a field. Analogous to a column-oriented database.

Primary Key—The primary key is a typically unique identifier for a particular record or row in a file or table. It can be created from one or more fields or columns contained in the record or row, the physical or logical or virtual location of the record or row in the file or table, record or row data content, or based on some other combination of data attributes that can be used to identify and/or locate the record or row.

Alternate Key—An alternate key is a secondary access path to the data (records or rows) in the file or table. Analogous to an index in an SQL relational database or an alternate key in an HPE NonStop Enscribe database.

Relative Key—A relative key is also called a Relative Record Number. A record or row identifier that is based on the physical or logical position of the record or row in the file or table. Often sequential, the records or rows are often a maximum fixed length in size so the position, or offset, of a particular record or row can be quickly computed from the beginning of the file or table via the relative key number.

SYSKEY—This entity is also called a system assigned key value or key values. A SYSKEY is one or more fields or columns that are automatically assigned, typically by the database, when a record or row is inserted into a file or table. They are generally unique within that file or table, and are often used as the whole or part of the primary key of that record or row. The SYSKEYs for the same record or row do not typically match across a replicated, loaded, or copied environment.

Key-sequenced file or table—This is a type of file or table that is organized (logically or physically) based on a primary or alternate key.

Relative file or table—This is a type of file or table that is organized (logically or physically) based on a relative key.

Entry-sequenced file or table—This a file or table that is organized (logically or physically) based on the insertion order of the records or rows into the file or table. Since the records or rows may be varying in length, the primary key of the record or row is often derived from the physical position of the record or row in the file or table.

Unstructured file or table—This is a file or table that has no specific structure to the contents, for example the data can be in any format and not necessarily adhere to a particular or specific record/field or table/column definition. Records or rows in an unstructured file or table can include the entire file or table contents, or be derived from attributes such as a fixed length to the records or rows, a set of one or more tokens to identify the beginning and/or end of the records or rows in the file or table (such as a carriage return/line feed at the end of the record or row), or a field in the data itself that defines the length of each record or row (such as a length field contained in the data that identifies the length of that particular record or row).

Order-sequenced files/tables—This type of file/table uses some form or ordering method to differentiate the different rows or records of a table/file. The ordering methods might be relative record number, physical order, or a primary or alternate key. Problems addressed by the present invention arise in comparing two files/tables if they differ in the ordering method used, or if the ordering method matches, but the actual records/rows in the file/table are out-of-order, e.g., from the results of operating system or database replication processing.

Data content sequenced files/tables—This type of file/table uses the contents of some or all of the data itself to differentiate the different rows or records of a table/tile. The physical, logical, or virtual ordering methods of the records or rows may differ from the source to the target. Hence, some or all of the data content of the records or rows is used to determine what is missing or extra or a duplicate between the source and the target. Problems addressed by the present invention arise in comparing two files/tables if the records or rows differ in their data content, for example no explicit ordering method exists for the records or rows as they may be inserted randomly (or differently) at both the source and the target. In some cases, there is only one record or row in the file(s) or table(s) being compared, in which case the set of file(s) or table(s) being compared are treated as separate records or rows of the file or table collection set.

Entry-Sequenced, Key-Sequenced, and Relative Files and Tables—These are types of HPE NonStop Guardian operating system file or SQL table types which are order-sequenced file types.

Unstructured Files—These are types of HPE NonStop Guardian and OSS operating system file types which are order-sequenced via the relative byte address (RBA) position of the data within them. Records inside unstructured files are usually delimited via a fixed length (for example, 100 bytes long), variable length via a length parameter contained in the data itself (for example, via a length field at the front of the each record), token delimited (for example, via strings of one or more characters, or tokens, such as carriage return/line feed, that mark the end of, or length of a record), or comma separated values (CSV) format. In some cases, there is no 'record' delimiter and the entire file, or a portion thereof, itself is considered a single record to be compared.

File or table partition—every file or table consists of one or more partitions. Often, a file or a table is divided into distinct subfiles called partitions. Each partition generally holds a unique set of the file or table's records or rows. Partitioning is often implemented to spread the data across multiple partitions, and hence disk drives, for better access or processing parallelism and to make very large files or tables fit across multiple smaller disk drives that have smaller size capacity.

File or table sharding—taking a file or table and breaking it up into distinct sets of data to allow for parallel processing on each data set to occur serially and/or in parallel.

Transaction—a transaction is the result of a specific type of request or requests that the application processes to provide a service. The transaction groups the various services needed to satisfy the request into a logical set of functions, operations, and/or processing to complete or satisfy the request (e.g., one or more data manipulation language (DML) or data definition language (DDL) operations). The transaction typically has a begin point (e.g., BEGIN step) and an end point (e.g., END step which is either a COMMIT or an ABORT). In most common commercial application environments, the transaction either will be fully implemented, or all effects of it will be removed, should the transaction fail or not be able to be completed for any reason.

Audited Transaction—A delimited set of database operations (inserts, updates, deletes, reads, create tables, and/or purge tables, etc.) that are either all made or none are made. An audited transaction is guaranteed to leave the database in a consistent state, and its results are typically guaranteed to survive system failures.

Unaudited Transaction—A database change or group of changes that is not audited. It has no explicit begin or end delimiter, though there may be logical boundaries. An unaudited transaction is not guaranteed to leave the database in a consistent state, and its results are typically not guaranteed to survive system failures.

ACID Properties—Audited transactions generally maintain the ACID properties of atomicity, consistency, isolation, and durability. Atomicity means that either all operations contained within the transaction are executed against the database or that none are. Consistency means that at any time, the view of the database represents an accurate view of the application data. Isolation means that a transaction is unaffected by other transactions that are executing simultaneously. Durability means that the resulting modification to the database by a transaction will survive any subsequent system failures. In some implementations, the ACID properties may be relaxed.

Atomicity—See ACID Properties.

Begin Transaction—A directive that indicates the beginning of an audited transaction. A begin transaction directive may be explicit, or it may be implicit such as with the first database operation for a transaction.

Begin Work—Equivalent to Begin Transaction.

Commit Transaction—A directive that indicates an audited transaction has completed successfully. The directive may be implicit with database that, for example, commit on disconnect or for single row updates.

Commit Work—Equivalent to Commit Transaction.

Abort Transaction—A directive that indicates an audited transaction has been unsuccessful and should be undone.

Rollback Work—Equivalent to Abort Transaction.

Uncompleted Transaction—A transaction that has begun but has been neither committed nor aborted.

Operating System—A software facility that manages computer hardware resources and provides common services for application processes. Services include time functions, reading and writing interprocess messages, and database manipulation.

End Users (also "Users")—People, systems, devices, applications, or any other entity that can influence an application or can request or use the services that it provides.

Indicia/indicium—A representation, which is often distinguishing, of the changes that an application is going to make to the database (typically, values provided in the transaction request), or the results of the changes that were made, but perhaps not committed yet, to the database (typically, database transaction "after" values). For instance, an indicium may be a unique hash or checksum of the changes, or it might be the complete set of changes. In some cases, multiple indicium (indicia) are computed, exchanged, and compared in the Validation Architecture configuration for each transaction request. Indicia and Indicium are used interchangeably herein and do not necessarily indicate the number of indicium involved in the applicable case. Indicia are usually based on a Hash value, such as CRC, SHA, MD5 or similar algorithm. These are calculated from sets of data, and they may be used to identify the data with fewer bits/bytes than in the original set of data. For example, a 128-bit hash value for a 100-byte string can be used to generate a 16-byte, or smaller if truncated, value which represents fairly uniquely that 100-byte string. Another 100-byte string with even one different byte will result in the generation of a completely different hash value which will almost certainly not match the hash value for the first 100-byte string. If the hash value algorithm does in fact produce the same hash value for two different input strings, then the strings themselves can always be compared if complete certainty is needed that the sets of data match. In some cases, the indicia may be the full original data, or a subset thereof.

Validation Architecture (VA)—A redundant system architecture in which two or more computing systems are actively processing the same transaction. Each system calculates indicia representing the changes that it will make, or made, to the database. If the two indicia compare, the transaction is committed (if not already committed). Otherwise, the transaction is aborted and an error is reported or in some embodiments only an alert or error message is issued, or one or more systems are shutdown, or other remediation action is taken such as:
  (i) issuing a database rollback on one of the systems,
  (ii) executing self-diagnostics on one of the systems.
  (iii) ignoring the issue, for example, if it will be repaired in a subsequent transaction,
  (iv) taking one of the systems or its application offline.
  (v) aborting the transaction executing on a subset of the systems (if more than two systems are in use), and
  (vi) resynchronizing the database at one or more systems.

Validation Architecture Systems that compute the indicia for the transaction being validated after the Commit happens on the nodes are called a Level 1 VA, and if before the Commit happens (after joining the transaction in some cases as a voting member) are called a Level 2 VA.

Redundant Architecture—A system architecture that consists of two or more nodes that are operating in a way to increase the overall availability of the application to end users. Active/Backup and Active/Active Architectures are the two primary redundant system architectures.

Consistent Database—A database is consistent if its data is valid according to all defined rules. For instance, a parent row must exist for every child row that refers to it.

Record-Oriented Database—A database that is accessed by specifying a key pointing to one or more records.

Field-Oriented Database—A database that is accessed by specifying a key pointing to a field.

Row-Oriented Database—A database that is accessed by specifying a key pointing to one or more rows.

Column-Oriented Database—A database that is accessed by specifying a key pointing to a column.

2.1 Validation Architecture Application Framework

The structure for implementing a Validation Architecture in a real system is called a Validation Architecture Application Framework.

Figure 4:
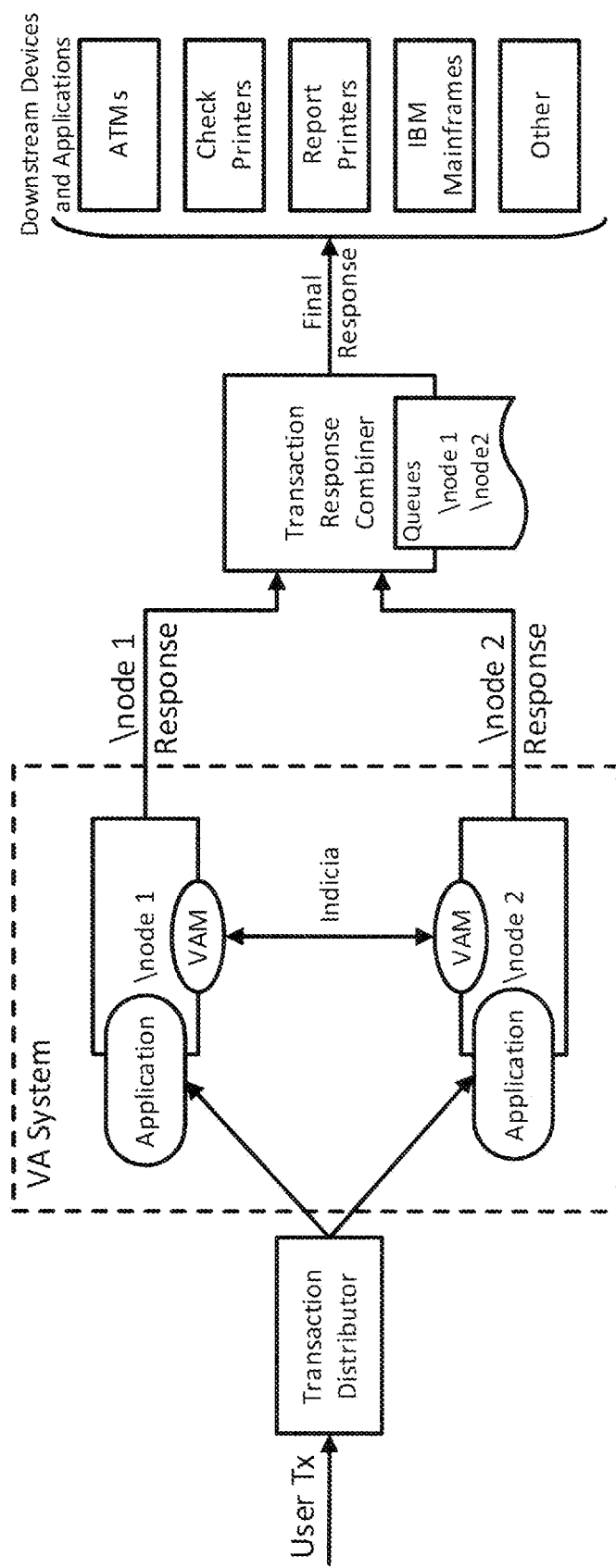
FIG. 4 shows Validation Architecture Application Framework for a two node Validation Architecture system in accordance with a preferred embodiment of the present invention.

FIG. 4 shows the framework containing a two node Validation Architecture system. FIG. 4 shows the following components:
  A. Transaction Distributor (TD)—takes an application or end user's request or transaction and sends it to the nodes of the VA system (here \Node1 and Node2) that are participating in the validation architecture. TD's may be synchronous (TD/s) and able to handle only one user request at a time or asynchronous/multi-threaded (TD/a) and able to handle multiple, overlapping user requests at the same time. The VA system may have many TD/a and TD/s distributors simultaneously feeding it overlapping user transactions.
  B. The Validation Architecture System—the nodes of the validation architecture system execute redundant copies of the user application. Located at each node for Level 1 and Level 2 VA's is a module called the Validation Architecture Module (VAM) which accomplishes the indicia creation from the outcome of the user transactions, and exchanges and compares it in accordance with the prior art methods.
  C. Transaction Response Combiner (TRC), also, interchangeably referred to herein as a "software engine"— In the simplest characterization, the TRC accepts the redundant responses from each node of the Validation Architecture system and generates a single final response for the VA system. There may be specialized TRC's receiving responses where the TRC's are specialized for the type of responses received from the nodes of the VA system.

2.2 Transaction Response Combiner (TRC)

Application processing is independently and redundantly accomplished on the various nodes of the VA system. In some application cases, for example, the ultimate results are the I/O's that need to be applied into the target databases at the nodes and no specific final response is expected to be output from the VA system. In other application cases, the ultimate results may be actions like printing and mailing of a check to a recipient, delivering cash at an ATM, or sending out announcements over the radio. As explained in the Background section, the output responses of the nodes executing the application may not always agree. Preferred embodiments of the present invention are able to combine the multitude of responses from the nodes of a VA system into a correct final response for use by downstream devices or endpoints.

Figure 5:
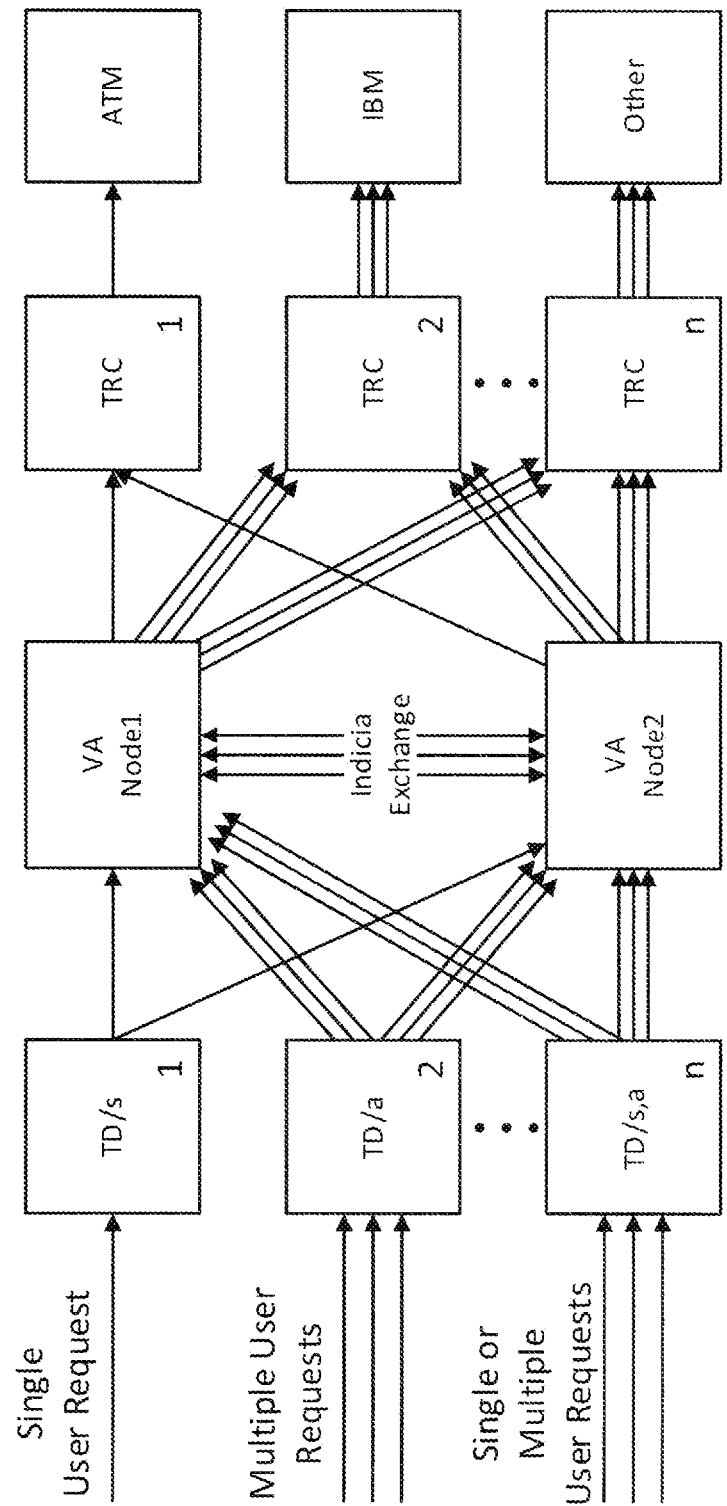
FIG. 5 illustrates that the Transaction Response Combiner's (TRC's) must be able to handle a multitude of simultaneous/overlapping/out-of-order VA system responses.

The preferred embodiments of the present invention allow for the TRC's to operate with a VA system simultaneously being fed by multiple Transaction Distributors. FIG. 5 shows that the TRC's must be able to handle a multitude of responses from the various nodes of the VA system, many responses may be overlapping in time or out-of-order, and some nodal responses may disagree with the responses other nodes for the same corresponding user request.

Figure 6:
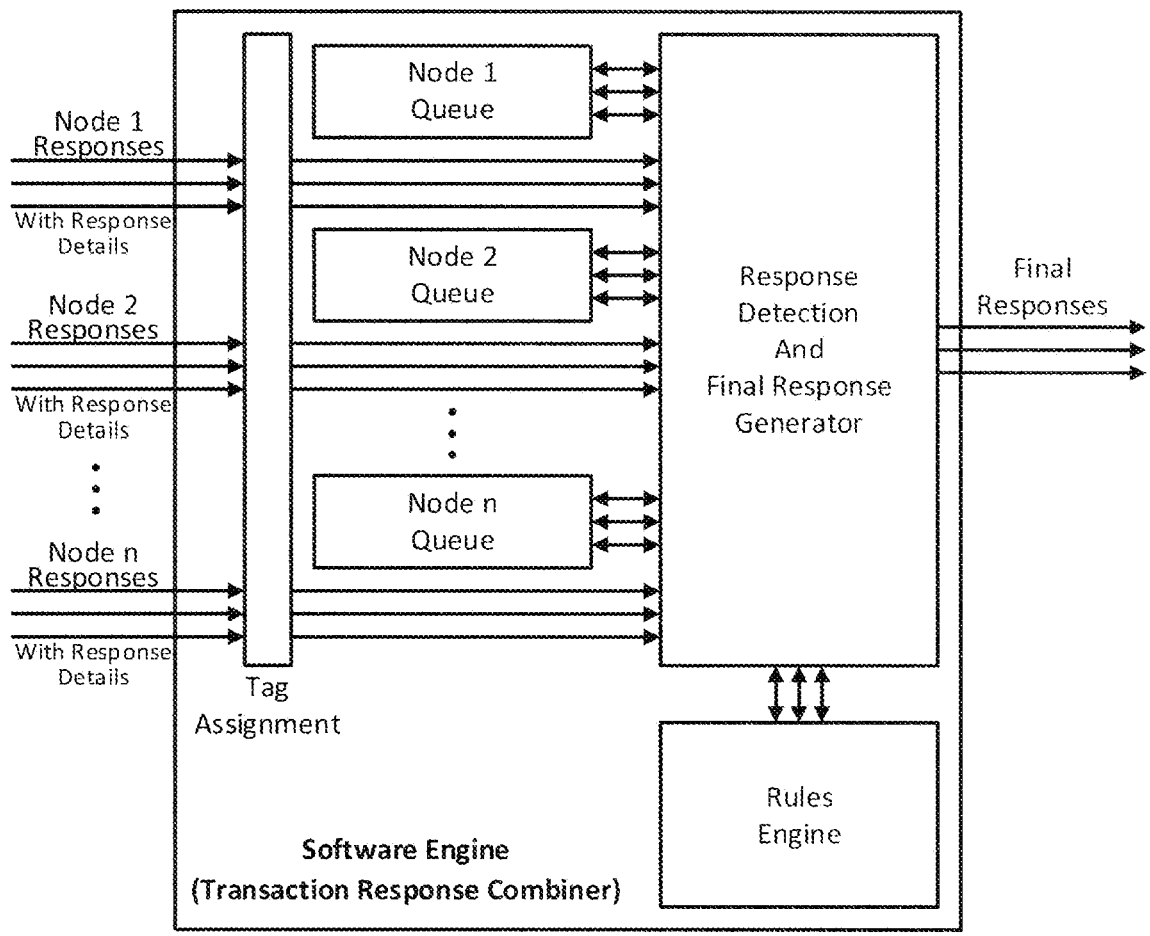
FIG. 6 shows the apparatus for implementing one preferred embodiment of the invention. The internal components of the TRC are illustrated.

The apparatus with the internal components of the TRC is illustrated in FIG. 6. In FIG. 6, the TRC receives a response from each of the nodes that the TD selected to process the user request. The TRC uses a component to assign tags to the respective responses by using identifiers that correspond with the respective user requests. Tags may be assembled from field subsets, columns, or rows of the responses, such as primary or alternate keys used in the user request or present in the responses. The tags might be passed through or generated by the TD, as in a batch ID. Or, the tags might be hashes (e.g. MD5 or SHA-256) of all or parts of any of the above. The goal of the tags is to be able to store the tagged responses in queues associated with the various nodes and be able to find them later to match up with responses arriving from slower or later processing nodes. At the TRC, at least the first tagged response from one node is inserted into a queue associated with that node at the TRC. The queue may be very shallow, for example, with a queue depth of one indicating that the response is simply stored in a single memory location. A shallow queue depth would be appropriate for a TRC which is able to process responses from a single user request at a time. Or, the queue may be very deep in order to be able to handle VA system nodes that are very fast and handling multiple simultaneous user requests. When the response detector/final response generator part of the TRC determines by matching tagged members of the various queues that it has all of the expected responses from the VA nodes (or that some nodes have timed out and either returned or have a NULL response assigned), a rules engine is invoked with the appropriate rules for the type of response. The rules engine uses the response details from the responses associated with the user requests to apply rules to enable the response detector/final response generator to generate and deliver the appropriate final responses to the downstream applications/users.

The rules engine contains rules that are specific for the particular types of responses expected for the user requests and types of downstream devices or applications that are receiving the final responses. Here are some examples:

A. Downstream devices/applications/processes/processors may be able to handle only a single response from the VA system. Selling 100 shares of a stock, for example, must be done only once per user request.

B. Idempotent devices—normally will operate once and only once on a response or duplicate responses received have the same end effect. So, for example, throwing the switch to open a safe, displaying something on a monitor, or setting the temperature to an absolute value can often be handled multiple times with no ill effect. However, the duplicated responses must be received by the idempotent device in a timely manner and there must not be other conflicting responses.

C. Toggle response control—one node of the VA system might be designated the responder, and the other nodes would be backups in case the designated node is slow or down.

D. Other devices—check printers, ATMs, alarms, and a multitude of others all have specific rules appropriate for their circumstances.

Table 1 shows some examples of TRC rules operating in different situations. The columns of the table show:

1. The end user request or transaction submitted to the Transaction Distributor.
2. The type of VA system (Level 0, 1, or 2) and the example output for each node.
3. The TRC rule appropriate for each type of user request.
4. Whether or not the rule is satisfied.
5. The final output response from the TRC.

TABLE 1

Example Variations of VA Types and Transaction Response Combiner Rule Executions

| USER REQUEST TRANSACTION # sent to Transaction Distributor | VA TYPE NODE 1 OUTPUT RESPONSE@ TIME | VA TYPE NODES 2 OUTPUT RESPONSE@ TIME | TRC RULE | TRC Rule satisfied | TRC OUTPUT FINAL RESPONSE |
|---|---|---|---|---|---|
| 1 Withdraw $100 from ATM on corner of 8$^{th}$ and Main St. | LEVEL 2 VA INDICIA MATCH: Transaction Committed "ATM #A654 command to deliver $100" @ 10:01:02AM | LEVEL 2 VA INDICIA MATCH: Transaction Committed "ATM #A654 command to deliver $100" @ 10:01:01AM | ATM rule: Both nodes must agree within 10 seconds | Yes | "ATM #A654 command to deliver $100" |
| 2 Withdraw $100 from ATM on corner of 8$^{th}$ and Main St. NOTE: Hacker changes withdrawal amount on Node #2 to $1000 | LEVEL 2 VA INDICIA MISMATCH: Transaction Aborted "ATM #A654 command to issue failure MM334 message" @ 10:02:02AM | LEVEL 2 VA INDICIA MISMATCH: Transaction Aborted "ATM #A654 command to issue failure MM334 message" @ 10:02:02AM | ATM rule: Both nodes must agree within 10 seconds | Yes (even though the underlying user request transaction aborted) | "ATM #A654 display 'SORRY, YOUR REQUEST CAN NOT BE COMPLETED: ERROR MM334'" |
| 3 Withdraw $100 from ATM on corner of 8$^{th}$ and Main St. | LEVEL 0 VA NO INDICIA COMPARED: Transaction Committed "ATM A654 command to deliver $100" @ 10:01:02AM | No response @ 10:01:12AM | ATM rule: Both nodes must agree within 10 seconds | No (timeout on Node 2) | "ATM #A654 display 'SORRY, YOUR REQUEST CAN NOT BE COMPLETED: ERROR NR87'" TRC sends alert for rule failure at ATM #A654 TRC sends alert and automatically fixes up database command "Set Node 1 account balance back to original amount" both nodes set back to same amount. |

TABLE 1-continued

Example Variations of VA Types and Transaction Response Combiner Rule Executions

| USER REQUEST TRANSACTION sent to Transaction # Distributor | VA TYPE NODE 1 OUTPUT RESPONSE@ TIME | VA TYPE NODES 2 OUTPUT RESPONSE@ TIME | TRC RULE | TRC Rule satisfied | TRC OUTPUT FINAL RESPONSE |
|---|---|---|---|---|---|
| 4 Withdraw $100 from Bank Branch on corner of 8th and Main St. | LEVEL 0 VA NO INDICIA COMPARED: Transaction Committed "TELLER #TS544 pay out $100" @ 5:59:59PM | Bank Closed @ 6:00:01PM | TELLER PRESENT rule: Both nodes must agree within 10 seconds | No | "TELLER 'SORRY, COME BACK LATER" TRC sends alert and automatically fixes up database command "Set Node 1 account balance back to original amount" both nodes set back to same amount. |
| 5 Print account balance report NOTE: No database transaction is involved. | Account #146 balance report @ 07:02:02 | Account #146 balance report @ 07:02:00 | Report printer rule: First node respondent prints, ignore other one | Yes | Print Node. 2 account #146 balance report, ignore Node 1's report. |
| 6 ePay electric bill | LEVEL 2 VA INDICIA MATCH: Transaction Committed Print check 78901 on account #687 for $1201.00 to Power Company (@ 07:02:02 | LEVEL 2 VA INDICIA MATCH: Transaction Committed Print check 78901 on account #687 for $1201.00 to Power Company (@, 07:02:00 | Check writer rule: Both nodes must agree within 5 seconds and the check must not be over $5000 | Yes | "Issue eCheck 78901 ACH on account #687 for $1201.00 to Power Company" |
| 7 Reserve Airline seat A12 on flight UA32 | Node down | LEVEL 0 VA: Transaction Committed Passenger P4452 is sitting in seat A12 on flight UA32 a 06:52:30 | Airline seating rule: Node 1 assigns, unless down then Node 2 assigns | Yes | Message to IBM mainframe: "Passenger P4452 is sitting in seat A12 on flight UA32" |
| 8 Precinct #2356 submits 120 votes for Party 1, and 331 votes for Party 2 | LEVEL 2 VA INDICIA MATCH: Transaction Committed Vote totals: Party 1: 8672, and Party 2: 9332 01:05:03AM | LEVEL 2 VA INDICIA MATCH: Transaction Committed Vote totals: Party 1: 8672, and Party 2: 9332 (@) 01:05:03AM | Election tabulation rule: Exact match required within 1 second. | Yes | Vote totals: Party 1: 8672, and Party 2: 9332 @ 01:05:03AM |
| 9 Precinct #2356 submits 120 votes for Party 1, and 331 votes for Party 2 NOTE: State actor backs tabulation on Node #2 | LEVEL 1 VA INDICIA MISMATCH: Transaction already committed, Alert Sent Vote totals: Party 1: 8672, and Party 2: 9332 @ 01:05:03AM | LEVEL 1 VA INDICIA MISMATCH: Transaction already committed, Alert Sent Vote totals: Party 1: 9672, and Party 2: 9332 @ 01:05:03AM | Election tabulation rule: Exact match required within 1 second. | No | No output (false tabulation report prevented) Additional alerts generated |

Variations on the preferred embodiment of the present invention include:

1. The computed final response may be produced only after a response has been received at the TRC from each of the plurality of nodes of the VA system.
2. The detecting detects a null response to a user request from a node. This may happen because of a timeout waiting for the expected additional responses from nodes of the VA system.
3. The TRC and the transaction distributor may be co-located or executing in the same processor. For example, at an ATM machine, the transaction distributor is configured to submit the cash withdrawal request to two VA system nodes and then a TRC located in the ATM would process the responses from the nodes.
4. The TRC queue depth may be one and may only be able to process responses to a single user request at a time.
5. The TRC queues may be in-memory or located on some sort of durable medium such as a hard disk.
6. The TRC queues for the nodes may be partitions of a single queue.
7. If a rule of the rules engine does not pass, the TRC may kick off alerts and or remediation actions that will repair damage done to the database or other parts of the VA system or downstream processes. These remediation actions mirror those actions that are available to the VA system when it identifies that indicia don't match. For example, the TRC might shut down an errant or corrupted VA system node, or it may start an "UNDO" database operation to reverse committed database steps or operations (DML and DDL) that were committed on one node and aborted on another.
8. The rules engine rules may average responses, or use another mathematical function, for the output. So, if the nodes produce a numeric response, then the final response would be an average, median, maximum, minimum, or other operation(s). Further, the responses from certain nodes may be weighted higher than for other nodes. For example, one node may have a newer processor types with more features than older, slower nodes, and be able to provide a more accurate response. So, the final response might be 60% of one node's response and 40% of the other node's response. In an extreme case, the weighting may be 100% for a preferred or more trusted node, and only if that node is down would other node responses and weightings be used.
9. As shown in FIG. 8, TRC final responses to downstream processes or devices might themselves produce acknowledgement or reverse responses (e.g. an ACK or "order processed" message) or confirmations (e.g. "check printed"). In this case, the TRC must work in reverse to format and send to the VA system nodes expecting or waiting on the downstream processes/device responses or acknowledgements. In some cases, queueing may be needed for a TRC attempting to deliver these acknowledgements.
10. Combinations of the above embodiments, rules, other programmed rules, or user supplied rules or operations could be utilized by the rules engine.

Apparatus of a Preferred Embodiment

FIG. 6 shows the hardware/software architecture for a system that implements a preferred embodiment. The system includes the TRC (software engine). The TRC includes a plurality of queues, one for each node in the system (not shown). The TRC also includes a Response Detection and Final Response Generator, and a Rules Engine. The TRC also performs Tag Assignment in a module dedicated to that function. The plurality of node responses and their respective response details are inputted into the Tag Assignment module and receive their respective tagged identifiers. The Tag Assignment module sends its output to the Response Detection and Final Response Generator, which, in turn, inserts the tagged responses into the appropriate queue.

The Response Detection and Final Response Generator detects when a response received at the TRC from one of the nodes has one or more corresponding responses in one or more of the queues by searching for responses that have the same tag. The Response Detection and Final Response Generator invokes rules of the Rules Engine to generate final responses which are outputted by the TRC.

Flowchart for the Preferred Embodiment

FIG. 7 is a flowchart in accordance with the preferred embodiment of the present invention. FIG. 7 shows the method operating on one of the nodes executing the redundant transaction.

During Step 701, the TRC receives a response (or a timeout) from a node for one of the user requests processed on the VA system.

During Step 702, the TRC uses identifiers that correspond with their respective user requests to tag the respective responses.

During step 703, the TRC searches in the queues for responses from other nodes with matching tags.

During Step 704, if insufficient queued responses are detected by the search (e.g. only one of three nodes have queued responses), the TRC inserts the tagged response for the one node into a queue associated with that node and resumes at Step 701. Otherwise, the IRC continues at Step 705.

During Step 705, rules of a rules engine are applied to the detected responses, and associated response details, detected in Step 703, to determine final output responses (e.g., a voting output) from the TRC for the original user request.

At Step 706, the TRC determines whether or not additional action is needed. If so, it will execute a TRC action at Step 707 such as: shutting down a VA system node, resetting balances by reversing database operations ("UNDO"), or issuing alerts.

Processing then resumes at Step 701 for the next response received by the TRC.

As noted above, the TRC is also interchangeably referred to herein as a "software engine." A software engine, as used herein, is implemented by a computer that performs intended functionality by executing instructions (i.e., program code). The functionality of the TRC is fully described above and is implemented by executing appropriate program code.

Similarly, the rules engine is also implemented by a computer that performs intended functionality by executing instructions (i.e., program code). Similarly, the functionality of the rules engine is fully described above and is likewise implemented by executing appropriate program code. More specifically, the rules engine is a software system that executes a set of defined rules in order to make decisions or take actions. The rules engine evaluates data and applies the rules to determine an outcome.

Similarly, the Response Detection and Final Response Generator is also implemented by a computer that performs intended functionality by executing instructions (i.e., program code). Similarly, the functionality of the Response Detection and Final Response Generator is fully described above and is likewise implemented by executing appropriate program code. More specifically, the Response Detection and Final Response Generator is a software system that executes a set of defined rules in order to make decisions or take actions. As discussed above, the Response Detection and Final Response Generator detects when a response received at the TRC from one of the nodes has one or more corresponding responses in one or more of the queues by searching for responses that have the same tag. The Response Detection and Final Response Generator invokes rules of the Rules Engine to generate final responses which are outputted by the TRC.

The Tag Assignment, Response Detection and Final Response Generator, and Rules Engine can also be viewed as being modules (sections of code) of the TRC (software engine).

It will be appreciated by those skilled in the art that changes could be made to the embodiments described above without departing from the broad inventive concept thereof. It is understood, therefore, that this invention is not limited to the particular embodiments disclosed, but it is intended to cover modifications within the spirit and scope of the present invention.

What is claimed is:

1. A method for combining output responses to a plurality of user requests in a system that validates transactions, the system including (i) a plurality of nodes, (ii) a transaction response combiner (TRC), and (iii) a plurality of queues located in the TRC, each queue being associated with one of the plurality of nodes, each node executing an instance of the same application, each node receiving each one of the plurality of user requests, the application producing an output response for each one of the plurality of user requests, each output response including response details, the method comprising:
    (a) receiving at the TRC an output response from each of the nodes for each of the user requests;
    (b) tagging each output response with an identifier that corresponds with the respective user request;
    (c) inserting into a queue associated with one of the plurality of nodes at least some of the tagged output responses for the one node;
    (d) detecting when an output response received at the TRC from one of the nodes has one or more corresponding output responses in one or more of the queues by searching for output responses that have the same tag; and
    (e) applying rules of a rules engine to combine the output responses generated by the applications on the plurality of nodes for each of the user requests into a final output response, the rules of the rules engine being applied to (i) the corresponding output responses with the same tag, and (ii) the response details for the output response that shares the same detected tag,
    wherein the final output response is outputted by the TRC.

2. The method of claim 1 wherein the detecting detects a null output response to a user request from a node.

3. The method of claim 2 wherein detection of a null output response is the result of a timeout.

4. The method of claim 1 wherein the identifier is a hash of the response details.

5. The method of claim 1 wherein step (e) occurs only after an output response has been received at the TRC from each of the plurality of nodes.

6. The method of claim 1 wherein the system further includes (iv) a transaction distributor, wherein the TRC and the transaction distributor are co-located or executing in the same processor, and wherein the TRC only receives output responses for the user requests sent by the transaction distributor.

7. The method of claim 1 wherein the queue depth is one.

8. The method of claim 1 wherein the plurality of queues are in-memory queues.

9. The method of claim 1 wherein the plurality of queues are partitions of a single queue.

10. The method of claim 1 wherein the rules of the rules engine are configured to indicate when a remediation action is needed, the method further comprising:
    (f) executing the remediation action when the applying of the rules in the rules engine indicates that the remediation action is needed.

11. The method of claim 1 wherein the combining of the output responses into a final output response includes a mathematical operation on selected response details of the responses.

12. The method of claim 1 wherein the system further includes (iv) one or more downstream devices or applications that receive the final output responses, the method further comprising:
    (f) the TRC receiving a reverse output response for the final output response from the one or more downstream devices or applications that receive the final output responses; and
    (g) the TRC delivering the reverse output response for the final output response to the plurality of nodes that had output responses which shared the same tag which was associated with the final output response.

13. An apparatus for combining output responses to a plurality of user requests in a system that validates transactions, the system including a plurality of nodes, the apparatus comprising:
    (a) a transaction response combiner (TRC);
    (b) a plurality of queues located in the TRC, each queue being associated with one of the plurality of nodes of the system, each node executing an instance of the same application, each node receiving each one of the plurality of user requests, the application producing an output response for each one of the plurality of user requests, each output response including response details,
    wherein the TRC is configured to:
    (i) receive at the TRC an output response from each of the nodes for each of the user requests,
    (ii) tag each output response with an identifier that corresponds with the respective user request,
    (iii) insert into a queue associated with one of the plurality of nodes at least some of the tagged output responses for the one node, and
    (iv) detect when an output response received at the TRC from one of the nodes has one or more corresponding output responses in one or more of the queues by searching for output responses that have the same tag; and
    (c) a rules engine configured to combine the output responses generated by the applications on the plurality of nodes for each of the user requests into a final output response, the rules of the rules engine being applied to (i) the corresponding output responses with the same detected tag, and (ii) the response details for the output response that shares the same detected tag,
    wherein the TRC is further configured to output the final output response.

14. The apparatus of claim 13 wherein the detecting detects a null output response to a user request from a node.

15. The apparatus of claim 14 wherein detection of a null output response is the result of a timeout.

16. The apparatus of claim 13 wherein the identifier is a hash of the response details.

17. The apparatus of claim 13 wherein the rules of the rules engine are applied only after an output response has been received at the TRC from each of the plurality of nodes.

18. The apparatus of claim 13 wherein the system further includes a transaction distributor, and wherein the TRC and the transaction distributor are co-located or executing in the same processor, and wherein the TRC is further configured to only receive output responses for the user requests sent by the transaction distributor.

19. The apparatus of claim 13 wherein the queue depth is one.

20. The apparatus of claim 13 wherein the plurality of queues are in-memory queues.

21. The apparatus of claim 13 wherein the plurality of queues are partitions of a single queue.

22. The apparatus of claim 13 wherein the rules of the rules engine are configured to indicate when a remediation action is needed, and wherein the rules engine is further configured to execute the remediation action when the applying of the rules in the rules engine indicates that the remediation action is needed.

23. The apparatus of claim 13 wherein the combining of the output responses into a final output response includes a mathematical operation on selected response details of the output responses.

24. The apparatus of claim 13 wherein the system further includes one or more downstream devices or applications that receive the final output responses, and wherein the TRC is further configured to:

(v) receive a reverse output response for the final output response from the one or more downstream devices or applications that receive the final output responses, and (vi) deliver the reverse output response for the final output response to the plurality of nodes that had output responses which shared the same tag which was associated with the final output response.

* * * * *